June 13, 1933. K. HENRICHSEN ET AL 1,914,092
RETRACTIBLE LANDING GEAR
Filed July 8, 1930 3 Sheets-Sheet 1

INVENTORS
KNUT HENRICHSEN & S. T. PAYNE
BY
ATTORNEY

June 13, 1933.  K. HENRICHSEN ET AL  1,914,092
RETRACTIBLE LANDING GEAR
Filed July 8, 1930  3 Sheets-Sheet 2

INVENTORS
KNUT HENRICHSEN & S.T. PAYNE
BY
W. Etaer Jr.
ATTORNEY

INVENTORS
KNUT HENRICHSEN & S. T. PAYNE
BY
ATTORNEY

Patented June 13, 1933

1,914,092

UNITED STATES PATENT OFFICE

KNUT HENRICHSEN, OF GARDEN CITY, AND SAMUEL T. PAYNE, OF FREEPORT, NEW YORK, ASSIGNORS TO CURTISS AEROPLANE & MOTOR COMPANY, INC., A CORPORATION OF NEW YORK

RETRACTIBLE LANDING GEAR

Application filed July 8, 1930. Serial No. 466,446.

Our invention relates to a retractible landing gear for airplanes. In the sense used herein, "landing gear" is intended to mean not only "landing gear" in the conventional sense, but to include both the forward landing gear and a rear landing gear such as a tail skid or tail wheel.

One of the objects of our invention is to provide a retractible landing gear so designed that not only the forward part thereof, but also the tail wheel or rearward part thereof may be retracted within the body portion and wings of the airplane.

A further object of the invention is to provide means whereby the parts of the landing gear may be projected forward and retracted rearward always along lines substantially parallel to the direction of flight so that in projecting the landing gear and in retracting it, the force of gravity may be counterbalanced to a greater extent than usual by the force of the air stream acting upon the exposed part of the landing gear.

A further object of our invention is to provide a landing gear of improved, simple, and strong type in which separate triangularly spaced supports are provided for each wheel and in which all of the landing gear structure is retractible within the body and wings of the airplane, but which is so constructed that on receiving landing shocks, the forward part of the landing gear moves forward and outward, the better to prevent nosing over or tipping to one side.

A further object of the invention is the provision in combination with a landing gear of the type described in the last paragraph, of an oleo strut capable of absorbing the shocks of landing.

A further object of the invention is to provide covers for the landing wheels and the landing struts capable of moving automatically (when the landing gear is retracted) to positions in which the covers completely surround and streamline the wheel and struts.

Further objects will be apparent from a reading of the subjoined specification and claims and from a consideration of the accompanying drawings.

In order to explain the invention more clearly, several embodiments thereof are shown in said drawings, in which.

Figure 2:
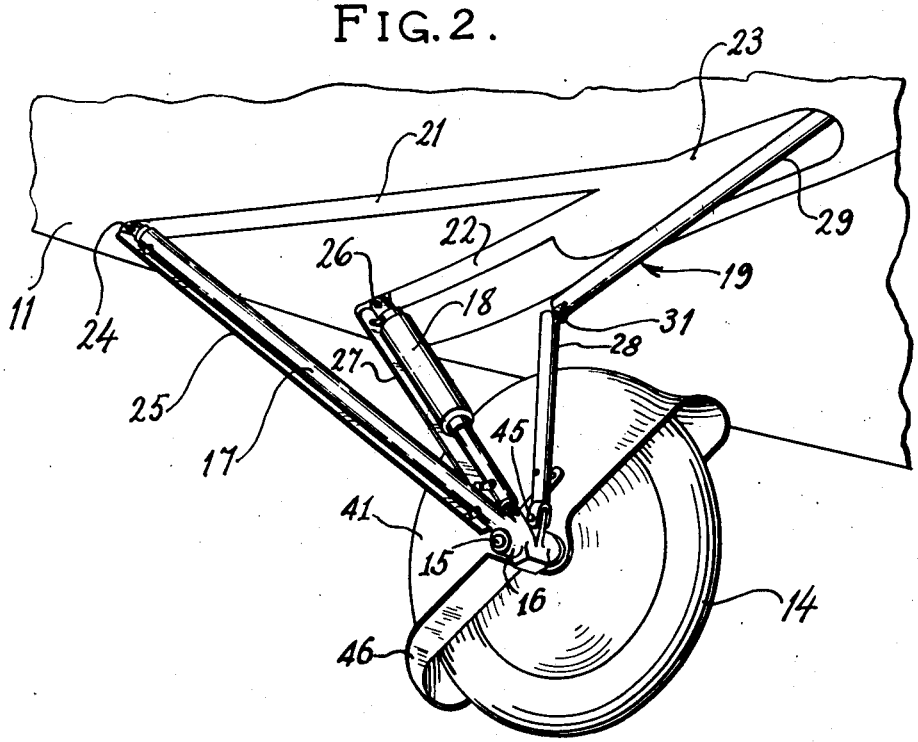
Fig. 2 is a perspective view on an enlarged scale of the forward part of the landing gear shown in Fig. 1 as it appears in the process of being retracted.
Figure 3:
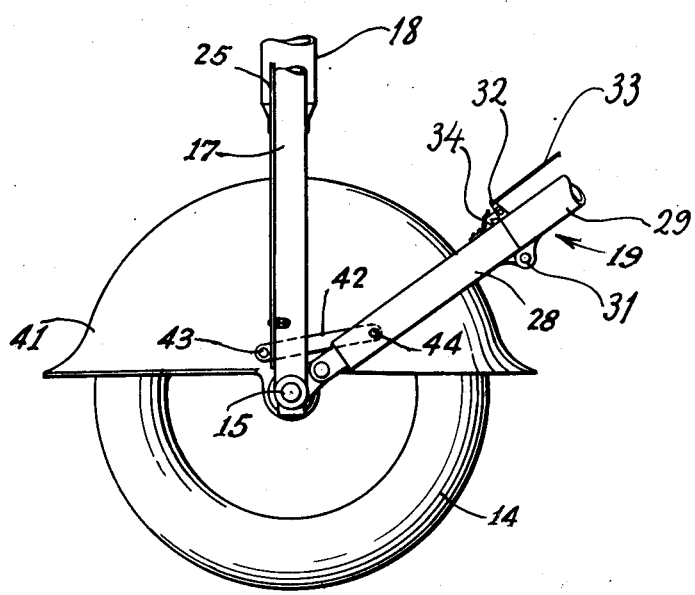
Fig. 3 is a view in elevation on an enlarged scale of one of the landing wheels and of the parts associated therewith.

Referring in detail to the drawings, wherein like reference numerals are used to indicate the same or similar parts, we have shown an airplane 10 equipped with a pair of wings, one of which is shown at 11, and with a landing gear, the forward part of which is generally designated 12 and the rear part of which is generally designated 13. The forward part 12 comprises a pair of laterally spaced wheels, one of which is designated 14 and may be seen in Figs. 1, 2 and 3. Inasmuch as the structure of the two wheels and of their supporting struts is alike except that one is reversed as to the other, description of one will suffice for both.

The wheel 14 is supported on a short axle 15, which axle is in turn carried by a hub fitting 16. Made integral with the fitting 16 is a strut 17 and attached thereto are other struts 18 and 19. These struts are pivotally attached within the wing 11 of the airplane at three spaced points so as to provide a triangularly braced structure for supporting the wheel 14. The wing 11 is provided with recesses 21, 22 and 23 into which the wheel 14, and the struts 17, 18 and 19 may be retracted.

The strut 18 is an oleo strut and provided with a conventional oleo shock absorber. It is pivoted at 26 within the wing 11 of the airplane 10. In the projected position of the landing gear, the strut normally extends vertically downward. The pivot 26 is arranged so that the associated strut 18 may pivot about two axes. When retracted the strut fits within recess 22 and within part of recess 23. A cover strip 27 is attached to the forward side of the lower part of the strut 18 and serves when the structure is retracted to enclose completely and to streamline the recess 22 and part of the recess 23.

The strut 19 is a broken strut and comprises two sections 28 and 29 joined by a hinge or knee joint 31 by which the effective length of the strut 19 may be materially shortened in retracting the landing wheel. The knee joint 31 (by which the strut may be broken, when it is desired to retract the landing wheel) forms a substantially firm joint when the landing gear is projected. It may be noted in Figs. 2 and 3 that the hinge 31 is offset from the strut on the side opposite to that in which the strut bends. Thus compression loads on the strut tend to maintain the strut in its straight line or projected position. A latch mechanism 32 (shown in Fig. 3) provided with an operating cable 33 aids in holding the strut against undesired bending at the knee joint 31. A leaf spring 34 is provided for holding the latch in its operative position. Retraction of the structure is accomplished by rotational movement of the upper part 29 of the strut 19. This rotational movement may be accomplished through rotation of the shaft 35 (Fig. 1) by means of a worm gear 36, a worm shaft 37 and a hand crank 38. Any other suitable mechanism might be employed for this purpose, if desired.

Figure 1:
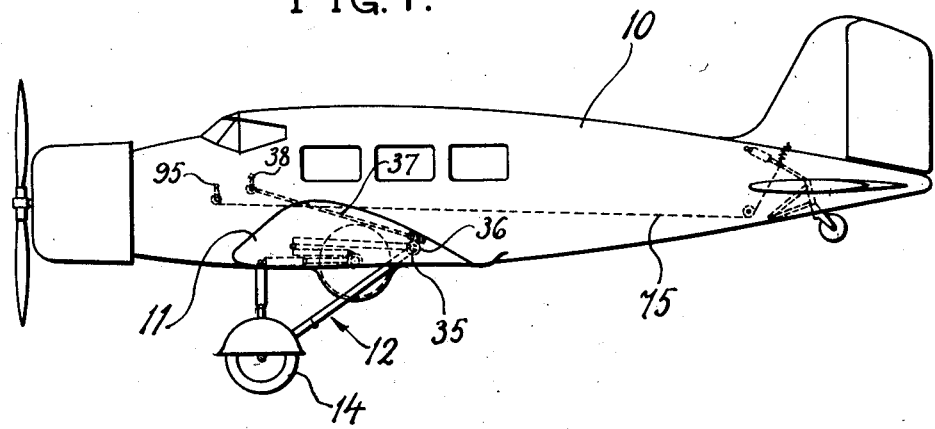
Fig. 1 is a view in elevation of an airplane equipped with landing gear constructed according to our invention.

When the wheel is in its retracted position, it extends partly into the recess 23 but the lower part of the wheel projects partly therefrom as shown in dotted lines in Fig. 1. In this retracted position, it is desirable that a cover be provided for the exposed portion in order to minimize the wind resistance thereon. To this end we have provided the cover 41 which is mounted for rotation upon the axle 15 of the landing wheel 14. The position of the cover 41 is controlled by a link 42 pivotally secured to the cover at 43 and to the lower part 28 of the broken strut 19 at 44. Thus, when the landing wheel is in the projected position shown in Fig. 3 the cover 41 is held substantially horizontal above the landing wheel. Due, however, to the positioning of the pivots 43 and 44 and the fact that the cover 41 rotates about the axle 15, whereas the strut 19 rotates about its pivotal axis 45 on the fitting 16, the rotational movement of the cover 41 and the strut 19 are not equal. When the forward part of the landing gear is retracted, the cover 41 rotates through about 180° while the part 28 of the strut 19 is rotating through about 135° and while the struts 17 and 18 are rotating approximately 90°. This causes the cover to assume a substantially horizontal position beneath the landing wheel 14 and thus effectively streamlines the landing wheel in its retracted position. The inner lower edge of the forward half of the cover 41 is flared as at 46 to form a strip similar to the strips 25 and 27. The cover 41 thus cooperates with the strip 27 to completely enclose the recess 23.

Figure 4:
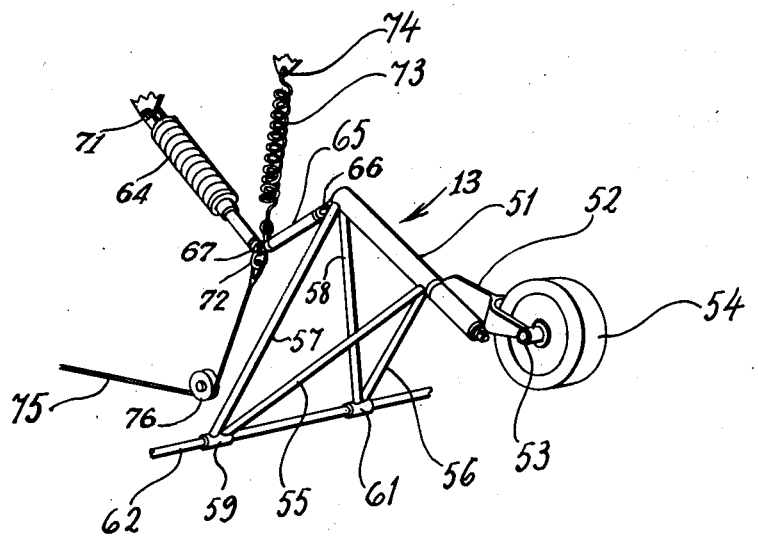
Fig. 4 is a view in perspective and on an enlarged scale of the tail wheel shown in Fig. 1, and of the parts associated therewith.

As shown most clearly in Fig. 4 the rearward part 13 of the landing gear comprises a tail post 51 on which is pivotally mounted a swiveled yoke fitting 52 carrying an axle 53 and a tail wheel 54. There is also firmly secured to the tail post 51 a frame work comprising the tubular metal members 55, 56, 57 and 58. Secured to the members 55 and 57 and 56 and 58, respectively, are sleeves 59 and 61. The sleeves 59 and 61 are mounted for rotational movement upon a transverse tubular metal member 62 which forms a part of the fuselage of the airplane. Secured by a hinged joint to the upper part of the tail post 51 is a broken strut comprising an oleo shock absorber upper member 64 and a solid lower member 65. The lower member 65 is hinged as at 66 to the upper part of the tail post 51 and as at 67 to the lower part of the upper member 64. The upper member 64 is also hinged as at 71 to a fixed part of the fuselage of the airplane. The hinge or knee joint 67 is offset similarly to the hinge joint 31 of the strut 19 so as to allow the breaking of the hinged joint 67 in only one direction. The hinged joint 67 carries a fitting 72 to which is secured a coil spring 73 having its opposite end fastened to a fixed part of the fuselage of the airplane as at 74. Thus, the coil spring 73 normally maintains the members 64 and 65 in an aligned relationship in which they form, in effect, a single compressible strut. A cable 75 which passes over suitable pulleys such as the pulley 76 and forward to the cockpit of the airplane, is secured to the opposite side of the fitting 72 and serves to break the knee or hinged joint 67 when desired. The forward end of the cable 75 may be secured to a hand crank 95. Thus it is possible to raise the rear part of the landing gear within the fuselage of the airplane.

Figure 5:
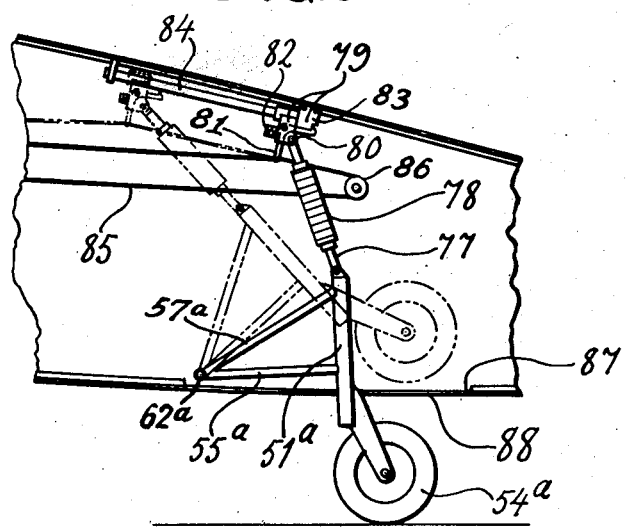
Fig. 5 is a view in elevation and on an enlarged scale of a modified form of tail wheel.

In Fig. 5 we have shown a modified form of retractible tail wheel somewhat similar to that shown in Fig. 4. Therein, the tail post 51ª corresponds to the tail post 51 and the frame members 55ª and 57ª correspond to the frame members 55 and 57, respectively. The tubular metal member 62ª corresponds to the tubular member 62 and additional frame members corresponding to the frame members 56 and 58 are also provided. Instead of the broken strut comprising the members 64 and 65, a single strut 77 is provided carrying an oleo shock absorber 78 and pivotally secured at its upper end to a fitting 79 as at 80. This fitting carries a latch 81 resiliently urged by a spring 82 into locking engagement with a lug 83 secured to a fixed part of the fuselage of the airplane. The fitting 79 is mounted for sliding movement on a rod 84 also secured to a fixed part of the fuselage of the airplane and extending longitudinally thereof. An endless cable 85 is secured to the latch 81 and passes forward therefrom to a hand crank similar to the hand crank 95 in the cockpit of the airplane. A part of the cable extends rearwardly over a pulley 86 and thereafter forwardly to the cockpit. Thereby the fitting 79 may be moved forward or backward in order to raise the landing wheel 54ª within the wing of the airplane or to project it out for landing. The initial movement of the cable 85 forward also operates the latch 81 to release it from locking engagement with the lug 83. There is provided an opening 87 in the lower part of the fuselage through which the wheel 54ª may be retracted and projected and a slitted leather covering 88 serves normally to prevent any substantial passage of the air stream thereinto and thus minimizes wind resistance. If desired a cloth or other flexible covering provided with resilient cords to maintain it in the desired position may be substituted for the leather covering.

Figure 6:
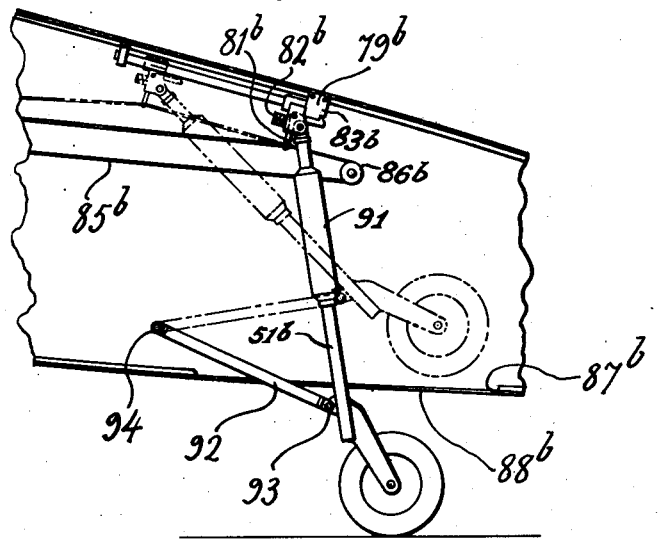
Fig. 6 is a similar view of a further modification of the tail wheel.

In Fig. 6 we have shown a still further modification in which the tail post 51ᵇ itself carries the oleo shock absorber 91 and is connected directly to the fitting 79ᵇ. The triangular frame provided in the embodiment shown in Figs. 4 and 5 is eliminated in this modification and a pair of struts, one of which is shown at 92, are each secured by a hinged joint such as 93 to the tail post 51ᵇ and are both carried for rotational movement on a tubular metal member 94 fixed to the fuselage of the airplane and corresponding to the member 62.

In the operation of an airplane equipped with our improved landing gear, the pilot takes off from the ground with the landing gear in the position shown in Fig. 1. After attaining sufficient altitude he operates the hand crank 38 to turn the worm shaft 37, the worm wheel 36 and the shaft 35. This turns the upper part 29 of the strut 19 and raises the wheel 14 into the recess 23, also raising the strut 18 into the recesses 22 and 23 and the strut 17 into the recess 21. The covers 25 and 27 move to cover the recesses 21 and 22 and to effectively streamline the lower part of the wing. The movement of the lower part 28 of the strut 19 about its pivot 45 operates through the link 42 to cause a rotation of the cover 41 through approximately 180° so that at the instant of full retraction the cover reaches a position substantially horizontal beneath the landing wheel 14 and contiguous with the wing 11. The flared portion 46 forms a continuation of the strip 27 and thus the cover 41 and the strip 27 cover the recess 23 and effectively streamline the wing. The pilot operates the hand crank 95 and thus pulls on the cable 75 against the action of the spring 73. This brakes the strut 64—65 and raises the tail post 51 and the tail wheel 54, rotating the frame work thereof about the shaft 62. As the tail wheel 54 passes through the opening 87, the leather cover or apron 88 closes and streamlines the rear part of the fuselage. When the pilot desires to land, he reverses the motion of the hand cranks 38 and 95 and thus causes the projection of the forward part of the landing gear. The force of gravity and the pull of the spring 73 cause the projection of the rearward part. It is to be especially noted that the force of gravity acting on both parts of the landing gear is counter-balanced to some extent by the force of the air stream also acting thereon. Thus in projecting both parts of the landing gear gravity aids the operator, and in retracting both parts of the landing gear the air stream aids the operator.

The operation of the embodiments shown in Figs. 5 and 6 is substantially the same as that shown in Figs. 1 to 4, inclusive.

On the first pull on the cable 85 or 85ᵇ the latch 81 or 81ᵇ is released from engagement with the lug 83 or 83ᵇ and allows subsequent movement of the fitting 79 or 79ᵇ. Continued pull upon the cable causes a movement forward of the fitting and the consequent rotation of the rear landing gear about the shaft 62ª or the shaft 94. Upon release of the cable 85 or 85ᵇ the force of gravity is probably sufficient to overcome the force of the wind stream and return the rear part of the landing gear to its original position where the spring 82 or 82ᵇ causes the locking of the latch. If the force of gravity is insufficient, a reversed operation of the hand crank forces the fitting 79 or 79ᵇ rearward and moves the tail wheel to its projected position.

It is to be understood that the above described embodiments of the invention are for the purpose of illustration only and various changes may be made therein without departing from the spirit and scope of the invention.

We claim as our invention:

1. A landing gear for an aerial vehicle comprising a solid strut pivotally secured to said aerial vehicle, a compressible strut pivotally secured to said aerial vehicle at a point laterally aligned with the point of pivotal connection of the first named strut and laterally spaced therefrom, a collapsible strut also pivotally connected to said aerial vehicle at a point longitudinally aligned with the point of pivotal connection of the compressible strut and longitudinally spaced therefrom, an axle supported by the ends of the three struts which are opposite to the ends which are pivotally connected with the aerial vehicle, and a landing wheel carried by said axle, said collapsible strut being adapted to have its effective length substantially shortened to permit the retraction of said landing gear.

2. A landing gear for an aerial vehicle comprising a strut pivotally secured to said aerial vehicle, a compressible strut pivotally secured to said aerial vehicle at a point laterally aligned with the point of pivotal connection of the first named strut and laterally spaced therefrom, a collapsible strut also pivotally connected to said aerial vehicle at a point longitudinally aligned with the point of connection of the compressible strut and longitudinally spaced therefrom, and a landing wheel supported by the ends of the three struts which are opposite to the ends which are pivotally connected with the aerial vehicle, said collapsible strut being adapted to have its effective length substantially shortened to permit the retraction of said landing gear.

3. A landing gear for an aerial vehicle comprising a strut pivotally secured to said aerial vehicle, a second strut pivotally secured to said aerial vehicle at a point laterally aligned with the point of pivotal connection of the first named strut and laterally spaced therefrom, a collapsible strut also pivotally connected to said aerial vehicle at a point longitudinally spaced rearward from the point of pivotal connection of the other struts, and a landing wheel supported by the ends of the three struts which are opposite to the ends which are pivotally connected with the aerial vehicle, said collapsible strut being adapted to have its effective length substantially shortened whereby the landing gear may be retracted rearward along lines substantially longitudinal of the aerial vehicle.

4. A landing gear for an aerial vehicle comprising a strut pivotally secured to said aerial vehicle, an oleo shock absorber strut pivotally secured to said aerial vehicle at a point laterally aligned with the point of pivotal connection of the first named strut, a collapsible strut also pivotally connected to said aerial vehicle at a point longitudinally aligned with the point of pivotal connection of one of the other struts and longitudinally spaced therefrom, and a landing wheel supported by the ends of the three struts which are opposite to the ends which are pivotally connected with the aerial vehicle, said collapsible strut being adapted to have its effective length substantially shortened to permit the retraction of said landing gear.

5. A landing gear for an aerial vehicle comprising; a solid strut pivotally secured to said aerial vehicle; a compressible strut pivotally secured to said aerial vehicle; a collapsible strut pivotally secured to said aerial vehicle; and a landing wheel carried by said struts at the ends thereof which are opposite to the ends which are connected to the aerial vehicle, said collapsible strut comprising an upper section, a lower section, and a hinge connecting said upper section and said lower section and offset from the line of said sections.

6. A landing gear for an aerial vehicle comprising; an oleo shock absorber strut pivotally connected to said aerial vehicle; a collapsible strut also pivotally connected to said aerial vehicle; and a landing wheel carried by said struts at the ends thereof which are opposite to the ends which are connected to the aerial vehicle, said collapsible strut comprising an upper section, a lower section, and a hinged joint connecting said upper section and said lower section and offset from the line of said sections.

7. In a landing gear for an aerial vehicle, landing wheel struts, a fitting pivotally supported by said struts on spaced pivots, a landing wheel pivotally supported upon said fitting, means for retracting said landing wheel within a recess in said aerial vehicle, a cover for said landing wheel pivotally mounted on said fitting, a link secured to said cover at a point spaced from the pivotal axis thereof and to one of said struts at a point spaced from the pivotal axis thereof whereby said cover may be moved from a position above said landing wheel when the wheel is projected to a position below said landing wheel when the wheel is retracted.

8. In a landing gear for an aerial vehicle; a landing wheel; means for retracting said landing wheel into a recess of said aerial vehicle; and a flexible cover for said recess having a slit therein through which the landing wheel may be retracted, which slit becomes substantially closed and forms a substantially smooth surface for said aerial vehicle, as soon as the landing wheel has been retracted therethrough.

9. In an aerial vehicle; a landing wheel; means for retracting said landing wheel into a recess of said aerial vehicle; and a flexible cover for said recess through which the landing wheel may be retracted, which cover forms a smooth surface for said aerial vehicle as soon as the landing wheel has been retracted therethrough.

10. In a landing gear for an aerial vehicle, a landing wheel, a support for said wheel, means for retracting said wheel within a recess in said aerial vehicle and for projecting it therefrom, a cover for said wheel held in spaced relation from the aerial vehicle body above said wheel when the latter is in projected position, and means for moving said cover against said aerial vehicle body when said wheel is retracted within said recess to close said recess.

11. A landing gear for an aerial vehicle comprising a landing wheel, a triangularly braced frame for supporting said wheel and including a collapsible strut having a hinge intermediate its length adapted to permit of forward projection and rearward retraction of said wheel and frame substantially parallel to the direction of flight, and means for buckling said hinge for collapsing said strut.

12. A landing gear for an aerial vehicle comprising an independent triangularly braced frame for each landing wheel of said landing gear including a solid strut pivotally secured to said aerial vehicle, a compressible strut pivotally secured to said aerial vehicle at a point laterally aligned with the point of pivotal connection of the first named strut and laterally spaced therefrom, a collapsible strut also pivotally connected to said aerial vehicle at a point longitudinally aligned with the point of pivotal connection of the compressible strut and longitudinally spaced therefrom, an axle supported by the ends of the three struts which are opposite to the ends which are pivotally connected with the aerial vehicle, said landing wheel being carried by said axle.

13. In an aerial vehicle having a recess formed in the under side thereof, a landing gear comprising three struts, one end of each said strut being pivotally attached to said aircraft, each said pivot being spaced from the other two, the other ends of said three struts being joined at an apex for carrying a landing wheel, one said strut having an offset hinge intermediate the ends thereof, and means adjacent the upper end of said last mentioned strut for moving said strut relative to said aircraft whereby said hinge is buckled and said landing gear is retracted within said recess.

In testimony whereof we hereunto affix our signatures.

KNUT HENRICHSEN.
SAMUEL T. PAYNE.